(12) United States Patent
Ohtsu

(10) Patent No.: US 6,334,657 B1
(45) Date of Patent: Jan. 1, 2002

(54) VEHICULAR BRAKE CONTROLLING APPARATUS AND METHOD

(75) Inventor: Nobuyuki Ohtsu, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/472,115

(22) Filed: Dec. 23, 1999

(30) Foreign Application Priority Data

Dec. 25, 1998 (JP) .............................................. 10-368676

(51) Int. Cl.⁷ ................................................. B60T 8/58
(52) U.S. Cl. .................... 303/177; 303/113.1; 303/157; 303/176; 303/183; 303/184
(58) Field of Search ................................ 303/177, 176, 303/157, 170, 113.1; 701/182, 183, 185, 187, 189, 199, 140, 146, 148, 184, 143, 163, 70, 71, 72, 78, 79, 82, 83; 188/181 A

(56) References Cited

U.S. PATENT DOCUMENTS 5,947,568 A * 9/1999 Watanabe ................... 303/184

6,212,462 B1 4/2001 Ohtsu et al.
6,246,946 B1 6/2001 Ohtsu

FOREIGN PATENT DOCUMENTS

JP 9-207745 8/1997

* cited by examiner

*Primary Examiner*—Douglas C. Butler
(74) *Attorney, Agent, or Firm*—Foley & Lardner

(57) ABSTRACT

Road wheel accelerations are calculated in a controller from respective road wheel velocity values. Any one of the road wheel velocities, including the road wheel velocity of one of the road wheels that is a controlled system in an anti-lock brake control during a brake operation, is selected on the basis of a predetermined condition, any one of the road wheel accelerations is selected from among results of calculations of the road wheel accelerations which corresponds to one of the road wheel velocities which is selected so as to generate a control-purpose road wheel acceleration, and anti-lock brake control is executed for each road wheel during the brake operation using the selected road wheel velocity and the control-purpose road wheel acceleration so as to prevent a wheel's lock for each road wheel from occurring.

19 Claims, 14 Drawing Sheets

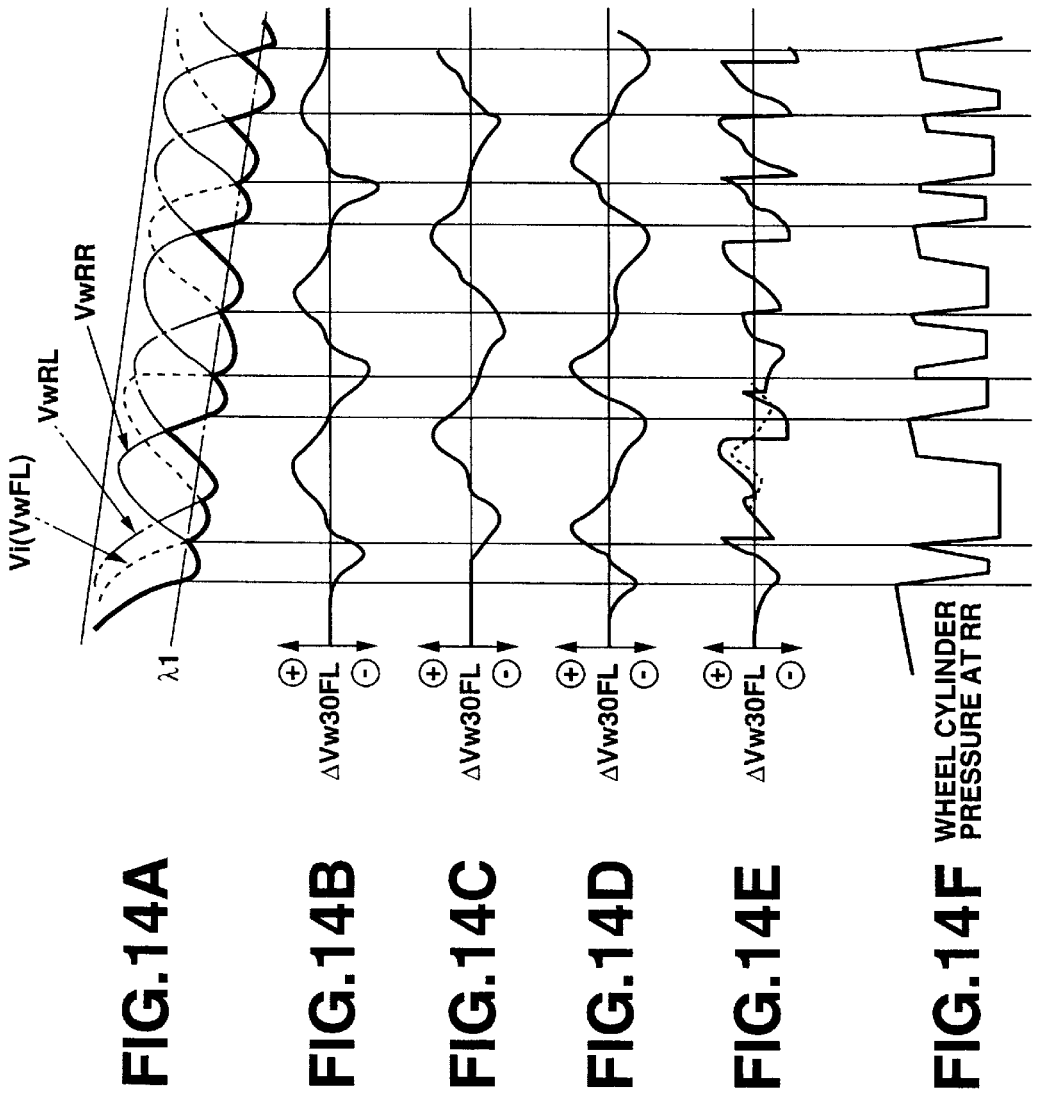

VEHICULAR BRAKE CONTROLLING APPARATUS AND METHOD

BACKGROUND OF THE INVENTION a) Field of the Invention

The present invention relates generally to brake controlling apparatus and method for executing an anti-lock brake control (hereinafter, also called ABS control) to prevent a wheel's lock by controlling a corresponding brake pressure during a braking operation and, particularly, to a technique of calculating arithmetically control-purpose wheel accelerations (decelerations) to be used for a braking liquid pressure decrease control.

b) Description of the Related Art

When the ABS control is executed in a brake control system, a previously proposed brake system determines road wheel velocities under control (hereinafter, referred to as control-purpose wheel velocities) of respective road wheels (front left and right road wheels and rear left and right road wheels) or the front left and right road wheels and one rear road wheel velocities), calculates a pseudo vehicular body velocity approximated to a vehicular running velocity from these control-purpose road wheel velocities, calculates a pressure decrease threshold value which is a road wheel velocity corresponding to a most appropriate velocity of the vehicle on the basis of the pseudo vehicular body velocity, and decreases the pressure of a corresponding wheel cylinder when the control-purpose road wheel velocity of the road wheel to be controlled is in excess of a pressure decrease threshold value so as to prevent the wheel's lock. If is also known that when the control-purpose road wheel velocity is generated, one of the four road wheels is selected from among the plurality of road wheels on the basis of a previously set condition and a select processing such as to set the road wheel velocity of the selected road wheel as the control-purpose road wheel velocity is carried out.

During the braking, the previously proposed brake control system determines a gradient of the pseudo vehicular body velocity on the basis of an acceleration of the pseudo vehicular body velocity and uses the control-purpose road wheel acceleration which is a differentiation of the control-purpose road wheel velocity of one rear road wheel with respect to time to the calculations such as the pressure decrease quantity of each road wheel. This is exemplified by a Japanese Patent Application First Publication No. Heisei 9-207745 published on Aug. 12, 1997.

SUMMARY OF THE INVENTION

It is noted that the above-described select processing includes, for example, a rear road wheel select low, an diagonal select low, a triangular select low, and a triangular select.

These select processing will briefly be explained below.

The rear road wheel select low is such that the control-purpose rear road wheel velocities VwRR0 and VwRL0 are selected from one of the values of the road wheel velocities VwRR and VwRL which is smaller than the other, viz., VwRR0 (VwRL0)=min {itself road wheel velocity Vw, the other road wheel velocity on the same axle Vw}.

The diagonal select low is such that the control-purpose rear road wheel velocity to be controlled is selected from either one of one of the rear road wheel velocities and one of the front road wheel velocities, both of which are in the same diagonal line, which is smaller than the other, viz., VwRR0 (VwRL0)=min {itself road wheel velocity Vw, and diagonal front road wheel velocity Vw}.

For example, if the object to be controlled is the rear left road wheel RL, a rear left road wheel controlling road wheel velocity VwRLO is selected from either one of the rear left road wheel. velocity VwRL or the front left road wheel velocity VwFL which is smaller than the other.

The triangular select low is such that any one of the values of the own vehicular velocity, the other road wheel velocities which is in the same axle line, and the diagonal front road wheels which is smallest than the other.

That is to say, VwRR0 (VwRL0)=min {itself road wheel velocity Vw, diagonal front road wheel velocity Vw}. For example, if the object to be controlled is the rear left road wheel RL, the brake control system sets one of the rear left road wheel velocities and the front right road wheel velocity VwRL and VwFL which is smaller than the other as the rear right road wheel control-purpose wheel velocity VwRL0.

The triangular select is such that either one of the diagonal front road wheel velocity and the same axle other wheel velocity which is larger than the other and either one of the larger value of the diagonal front road wheel velocity and the same axle other road wheel velocity which is smaller than the other and the rear road wheel control-purpose road wheel velocity, viz., max {the same axle other wheel velocity Vw, diagonal front road wheel velocity Vw}}. For example, if the object to be controlled is the rear left road wheel RL, the brake control apparatus, for example, sets the larger value of the rear right road wheel velocity VwRR and the front right road wheel velocity VwRF to be the rear left road wheel control-purpose wheel velocity VwRL0 if the object to be controlled is the rear left road wheel RL.

However, in the previously proposed brake control system, the rear road wheel control purpose road wheel acceleration is determined by differentiating the rear road wheel control-purpose wheel velocity with respect to time generated by means of the previously determined rear road wheel select low, the diagonal select, the triangular select low, and the triangular select.

Hence, in a case where the selected road wheel is sequentially varied, the control-purpose road wheel acceleration is calculated with the road wheel to be selected switched. Hence, a sufficient time to determine a variation rate of the road wheels to be selected with a high accuracy cannot be obtained. Such a problem occurs that only the control-purpose wheel acceleration with a low accuracy can be obtained or the control-purpose wheel acceleration indicates an excessively small value. In addition, such a problem occurs that if the control-purpose wheel acceleration is not calculated until a time to obtain the highly accurate control-purpose wheel acceleration has passed, a retardation of a control responsive characteristic occurs. Furthermore, in a case where the control-purpose road wheel acceleration indicates the excessively small value, the pressure decrease quantity is set to be excessively small. Due to a lack in pressure decrease quantity, the pseudo vehicular body velocity indicates the smaller value than the actual one so that a rear road wheel cornering force is reduced and a controllability is worsened.

It is therefore an object of the present invention to provide vehicular brake controlling apparatus and method for selecting a single road wheel velocity from a plurality of road wheels through a predetermined select processing to determine a rear road wheel control-purpose wheel velocity (or velocities), for determining the rear road wheel control-purpose wheel acceleration (or accelerations) with the high accuracy and high responsive characteristic even if the switching of the selected road wheel is carried out, and for preventing the retardation of the control responsive characteristic, and which can provide an appropriate quantity of the braking liquid pressure decrease, and can improve a control quantity.

The above-described object can be achieved by providing a vehicular brake controlling apparatus comprising: a brake unit arranged to enable an independent control of braking liquid pressures for respective wheel cylinders to brake their corresponding road wheels of the vehicle; a plurality of road wheel velocity sensors to detect respective wheel velocities of the road wheels of the vehicle, the road wheels being front left and right and rear left and right road wheels; and a controller, the controller including: a road wheel acceleration calculating section to calculate road wheel accelerations of the respective road wheels from respective road wheel velocity values detected by the road wheel velocity sensors; a road wheel velocity select processing section to select any one of the road wheel velocities including the road wheel velocity of one of the road wheels that is an object to be controlled in an anti-lock brake control during a brake operation on the basis of a predetermined condition, the selected road wheel velocity serving as a control-purpose road wheel velocity; a control-purpose road wheel acceleration generating section to select any one of the road wheel accelerations from among results of calculations of the road wheel accelerations by means of the road wheel acceleration calculating section which corresponds to one of the road wheel velocities which is selected by the road wheel velocity select processing section so as to generate a control-purpose road wheel acceleration; and an anti-lock brake controlling section to execute the anti-lock brake control for each road wheel through the brake unit during the brake operation using the control-purpose road wheel velocity and the control-purpose road wheel acceleration so as to prevent a wheel's lock for each road wheel from occurring.

The above-described object can also be achieved by providing a brake controlling method for an automotive vehicle, the vehicle including: a brake unit arranged to enable an independent control of braking liquid pressures for respective wheel cylinders to brake their corresponding road wheels of the vehicle; a plurality of road wheel velocity sensors to detect respective wheel velocities of the road wheels of the vehicle, the road wheels being front left and right and rear left and right road wheels; and a controller, the brake controlling method comprising the steps of: calculating road wheel accelerations of the respective road wheels from respective road wheel velocity values; selecting any one of the road wheel velocities including the road wheel velocity of one of the road wheels that is an object to be controlled in an anti-lock brake control during a brake operation on the basis of a predetermined condition, the selected road wheel velocity serving as a control-purpose road wheel velocity; selecting any one of the road wheel accelerations from among results of calculations of the road wheel accelerations which corresponds to one of the road wheel velocities which is selected so as to generate a control-purpose road wheel acceleration; and executing the anti-lock brake control for each road wheel through the brake unit during the brake operation using the control-purpose road wheel velocity and the control-purpose road wheel acceleration so as to prevent a wheel's lock for each road wheel from occurring.

BRIEF DESCRIPTION OF THE DRAWINGS

FIGS. 14A, 14B, 14C, 14D, 14E and 14F are integrally a timing chart representing the operation example of the fourth preferred embodiment of the vehicular brake controlling apparatus.

DETAILED DESCRIPTION OF THE PREFERRED EMBODIMENTS

Reference will hereinafter be made to the drawings in order to facilitate a better understanding of the present invention.

(First Embodiment)

Figure 1:
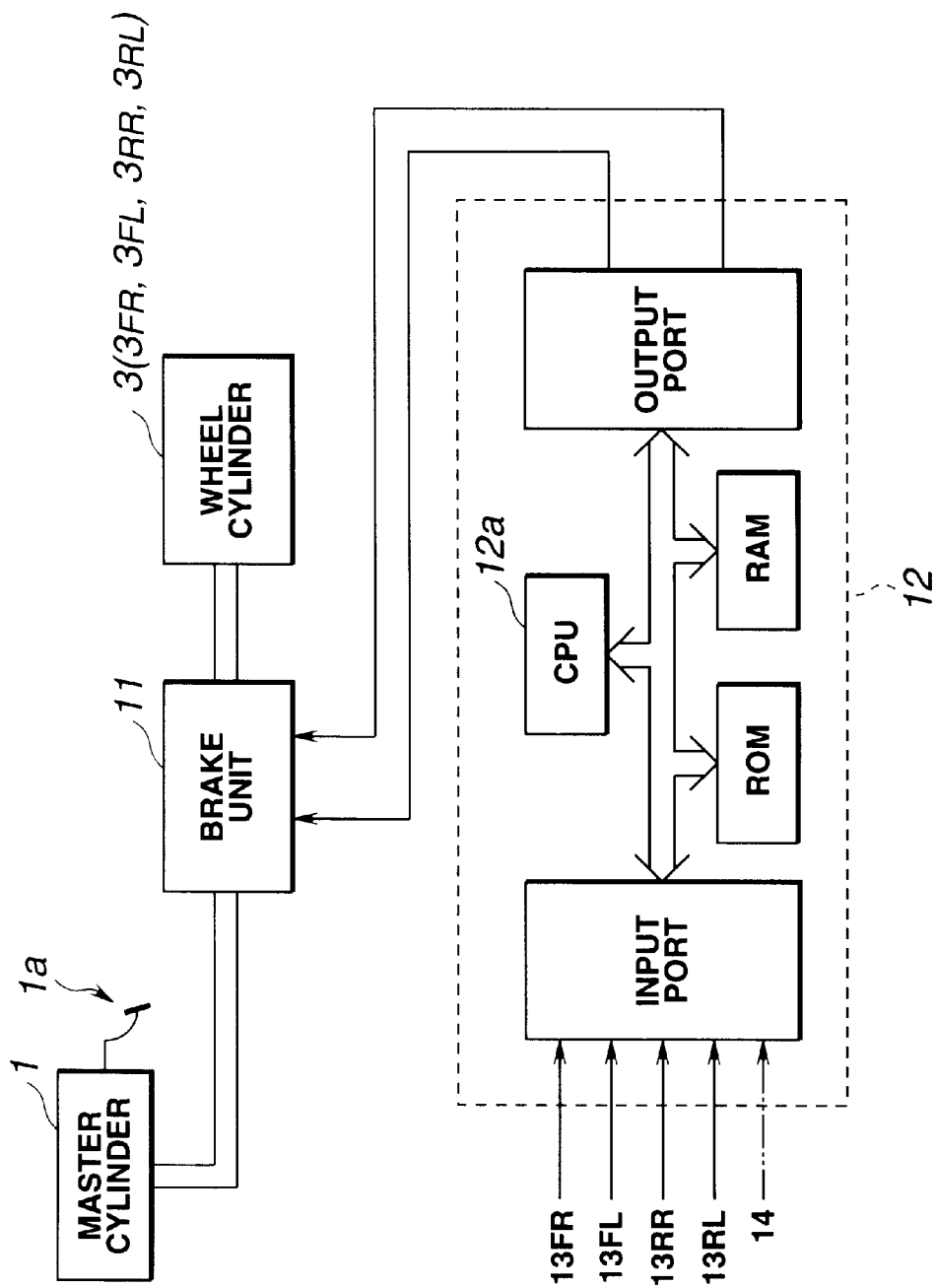
FIG. 1 is a hydraulic-and-electric circuit block diagram of a vehicular brake control apparatus in a first preferred embodiment according to the present invention.

FIG. 1 shows a general concept of a vehicular brake controlling apparatus in a first preferred embodiment according to the present invention.

In FIG. 1, a master cylinder 1 is constructed to develop a brake liquid pressure through a depression of a brake pedal 1a by a vehicular driver. A brake unit 11 is interposed between a representative wheel cylinder 3 and the master cylinder 1.

A controller 12 receives each signal derived from a plurality of vehicular road wheel revolution sensors 13FR, 13FL, 13RR, and 13RL and outputs control signals to the brake unit 11.

Figure 2:
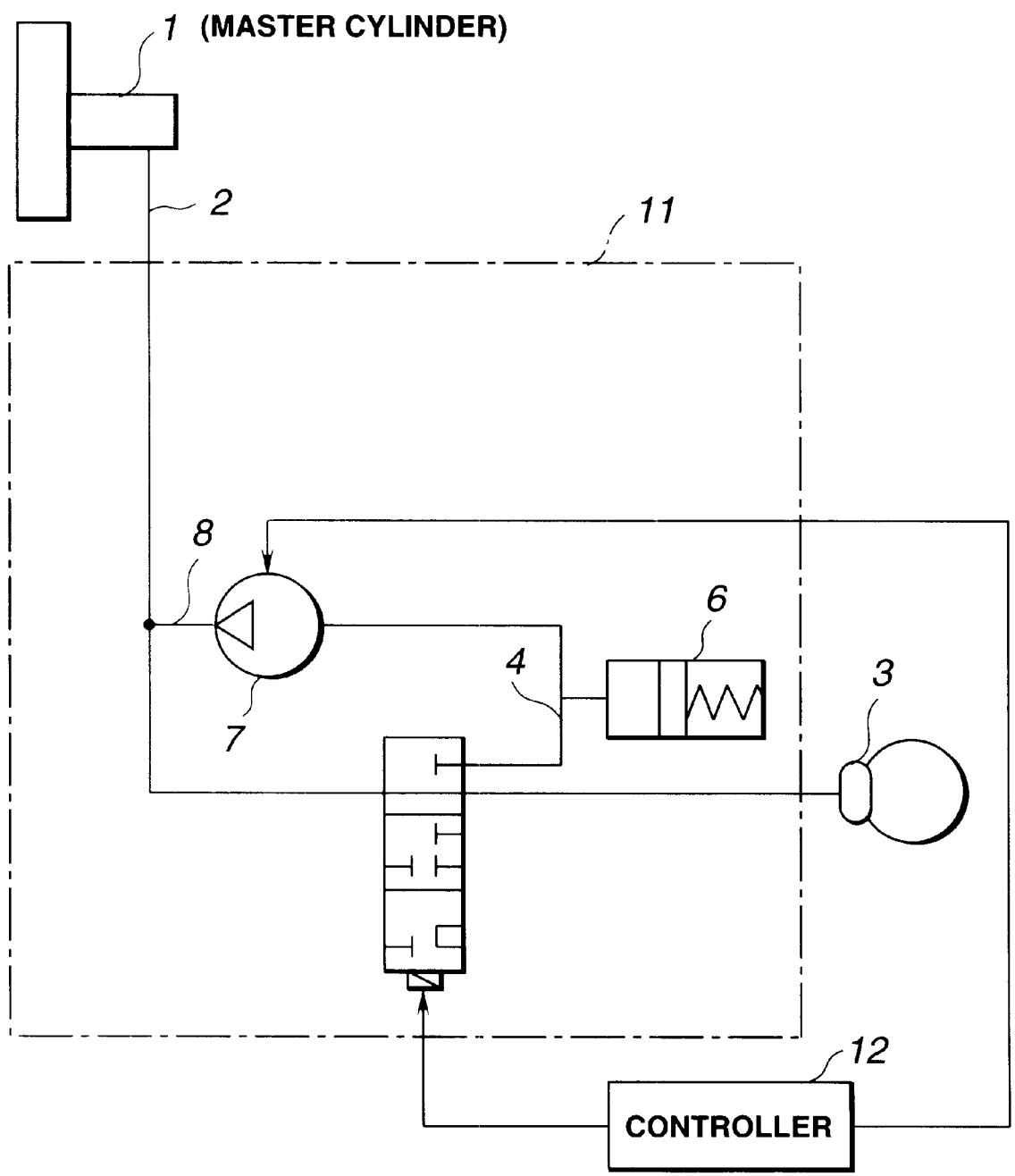
FIG. 2 is a schematic hydraulic-and-electric circuit block diagram of an essential part of the first preferred embodiment of the vehicular brake controlling apparatus.
Figure 3:
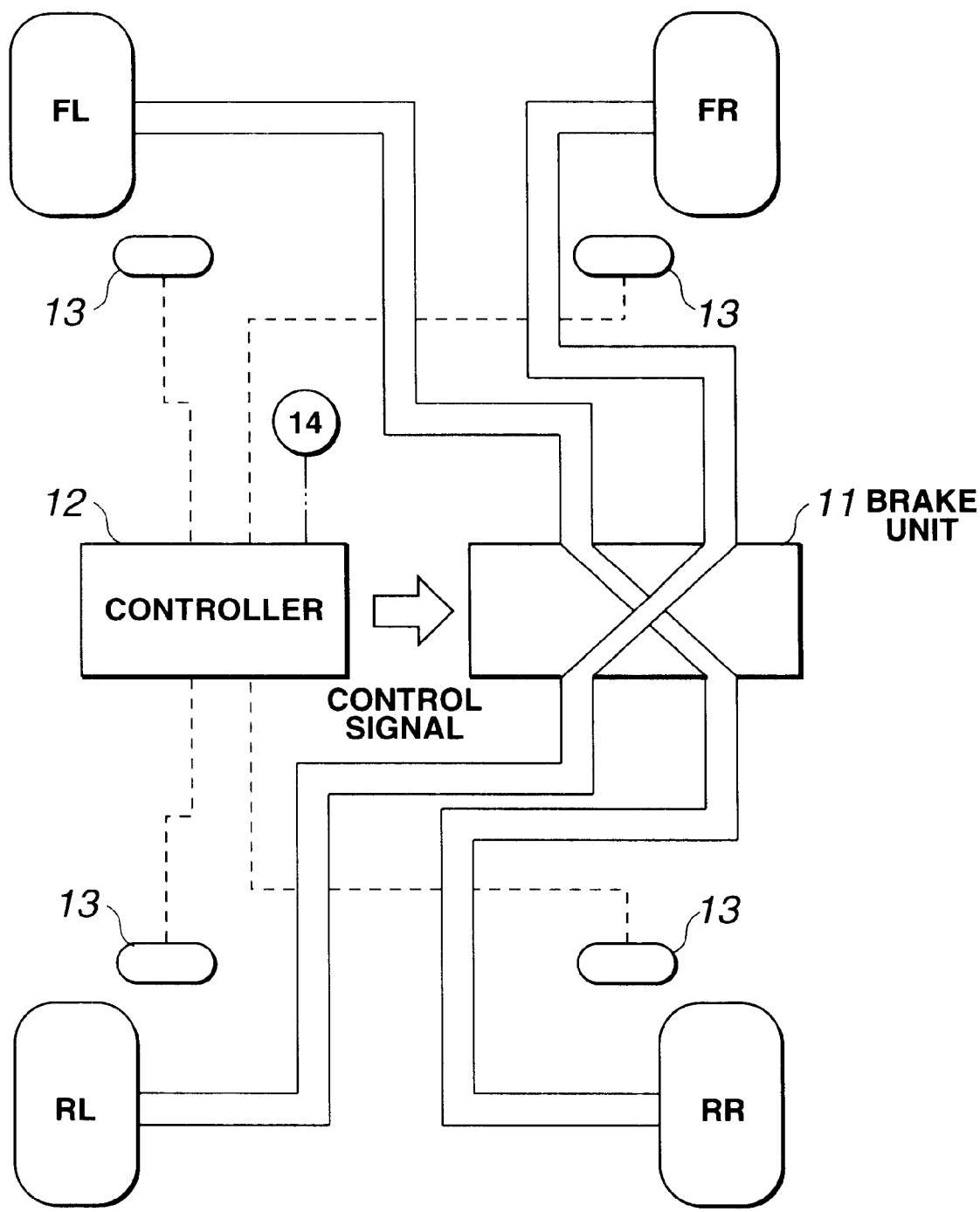
FIG. 3 is a whole system configuration of the vehicular brake controlling apparatus.

FIG. 2 shows an internal hydraulic circuit of the brake unit 11.

The master cylinder 1 is connected to the representative wheel cylinder 3 via a brake circuit 2.

A three-way switching valve 5 is interposed in a midway through the brake circuit 2 to be enabled to switch states of hydraulic pressures as a pressure increase condition in which an upstream side (master cylinder) of the brake circuit 2 is communicated with a downstream side (wheel cylinder 3) thereof; a pressure decrease condition in which a brake liquid in the downstream side (wheel cylinder 3) thereof is drained (discharged) to a drain circuit 4; and a pressure hold condition in which the brake circuit 2 is interrupted to hold a braking liquid pressure of the representative wheel cylinder 3. Hence, the brake liquid pressure in the representative wheel cylinder 3 is arbitrarily controllable on the basis of the switching of the switching valve 5.

A reservoir (reserve tank) 6 is interposed so as to enable a reserve of the brake liquid.

A circulation circuit 8 is disposed to connect the reservoir 6 to a position located upstream with respect to the switching valve 5 and a pump 7 to circulate the brake liquid reserved into the reservoir 6 to the brake circuit 2.

It is noted that although FIG. 2 explains the internal circuit structure for a representative road wheel, the brake unit 11 is structured so as to be enabled to control respective brake liquid pressures of a plurality of wheel cylinders 13FR, 13FL, 13RL, and 13RR on front right road wheel FR, front left road wheel FL, rear right road wheel RR, and the rear left road wheel RL.

The controller 12 controls the operations of the switching valve 5 and a pump 7 of the brake unit 11.

Next, a brake control executed in the controller 12 will be described below.

Figure 4:
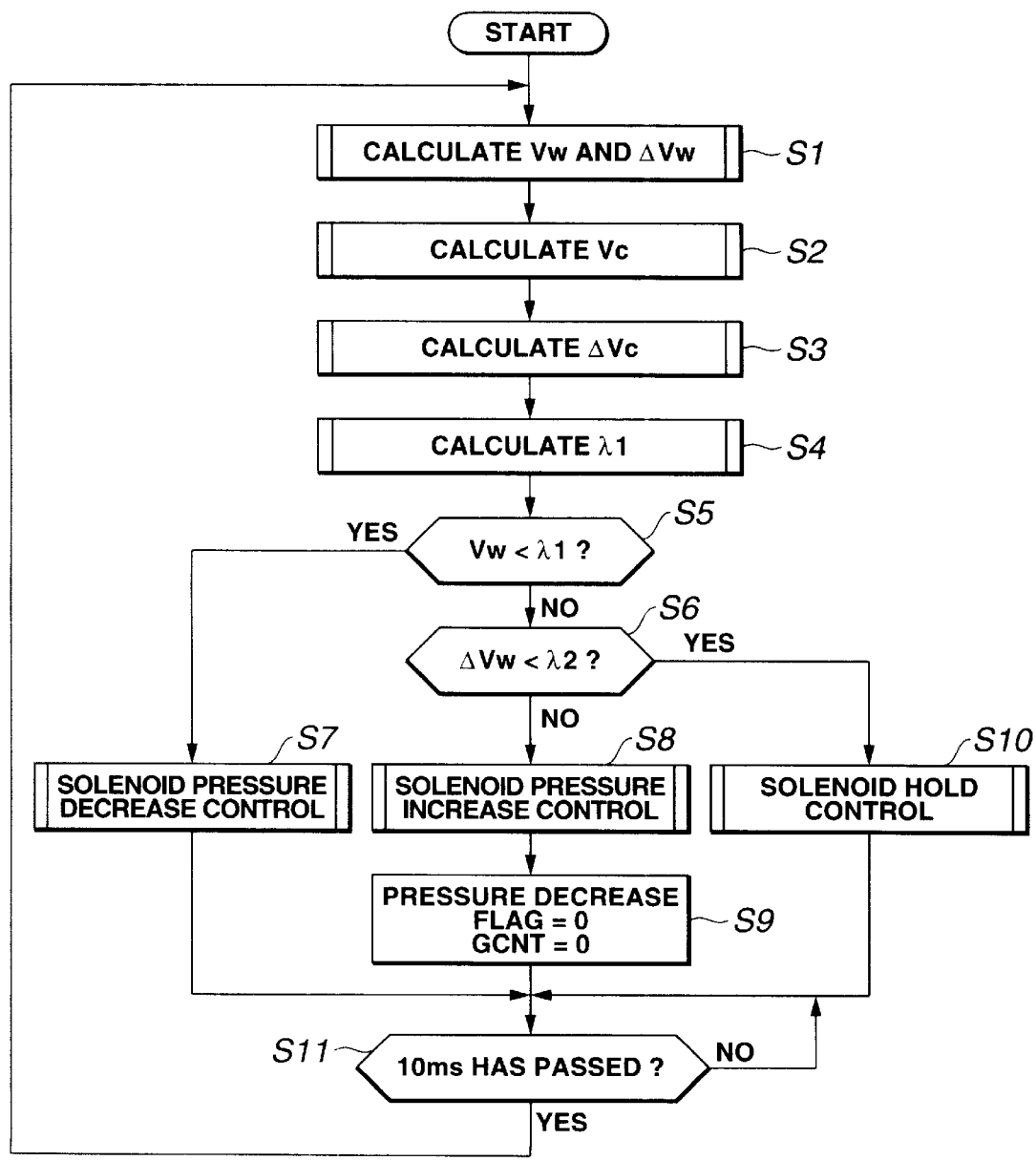
FIG. 4 is a main operational flowchart representing the ABS control in the first preferred embodiment of the vehicular brake controlling apparatus.

FIG. 4 shows a whole brake control (the ABS control) executed by the controller 12 in the first preferred embodiment shown in FIG. 1.

In the brake control, a first control (so-called, an ABS control) in which the brake liquid pressure is controlled for each road wheel to prevent a road wheel lock during the vehicular braking and a second control (so-called, a braking force distribution control) to control the braking liquid pressure of the rear road wheels so that the braking liquid pressures for the rear right and left road wheels do not become excessive during the braking.

The above-described brake control shown in FIG. 4 is executed whenever 10 milliseconds have passed.

It is noted that the controller 12 shown in FIG. 1 includes a microcomputer having a CPU (Central Processing Unit) 12a; a ROM (Read Only Memory); and a RAM (Random Access Memory); an Input Port; an Output Port; and a common bus.

At a step S1, the CPU 12a reads a signal from each road wheel speed sensor 13 to calculate a corresponding road wheel velocity and to calculate a corresponding road wheel acceleration. It is noted that the front right road wheel velocity is VwFR, the front left road wheel velocity is VwFL, the rear right road wheel velocity is VwRR, and the rear left road wheel velocity is VwRL.

At the subsequent step S2, the CPU 12a calculates a pseudo vehicular body velocity Vi. The pseudo vehicular body velocity Vi is derived on the basis of control-purpose road wheel velocities VwRR0 and VwRL0 as will be described later.

At the next step S3, the CPU 12a determines a vehicular body deceleration $\Delta$Vi from a variation rate of the pseudo vehicular body velocity Vi per time. At the subsequent step S4, the CPU 12a calculates the pressure decrease threshold value $\lambda$1 on the basis of a calculation of $\lambda$1=Vi K−x. It is noted that K denotes a constant and, for example, about 0.95. It is noted that x can be used for a high $\mu$ road and for a low $\mu$ road. Specifically, about 8 in the high $\mu$ road and about 4 in the low $\mu$ road. It is noted that the road surface $\mu$ (namely, a frictional coefficient of the road surface) may be determined using the detected values of the longitudinal acceleration sensors 14 or may be determined using the control-purpose road wheel accelerations $\Delta$Vw30RR0 and $\Delta$Vw30RL0 without use of the longitudinal acceleration sensor(s) 14 (hence, the longitudinal acceleration sensors may be omitted).

At the step S5, the CPU 12a determines whether each road wheel velocity VwFR, VwFL, VwRR, and VwRL is equal to or less than the pressure decrease threshold value $\lambda$1. If the pressure decrease threshold value is less than the pressure decrease threshold value $\lambda$1 (Yes at the step S5), the routine goes to a step S7.

If the pressure decrease threshold value $\lambda$1 is equal to or larger than the pressure decrease threshold value $\lambda$1 (No at the step S57, the routine goes to a step S6.

At the step S6, the CPU 12a determines whether the acceleration $\Delta$Vw of each road wheel is less than a predetermined negative hold threshold value $\lambda$2. If $\Delta$Vw $\geq\lambda$2 (No) at the step S6, the routine goes to a step S8. If $\Delta$Vw<$\lambda$2 (Yes) at the step S6, the routine goes to a step S10. On the other hand, if $\Delta$Vw<$\lambda$2 (Yes) at the step S6, the routine goes to a step S8 in which a pressure decrease flag as will be described later or a pressure decrease counter GCNT is cleared.

It is noted that the processing flowchart of FIG. 4 is executed whenever a time of, for example, 10 milliseconds has passed.

Figure 5:
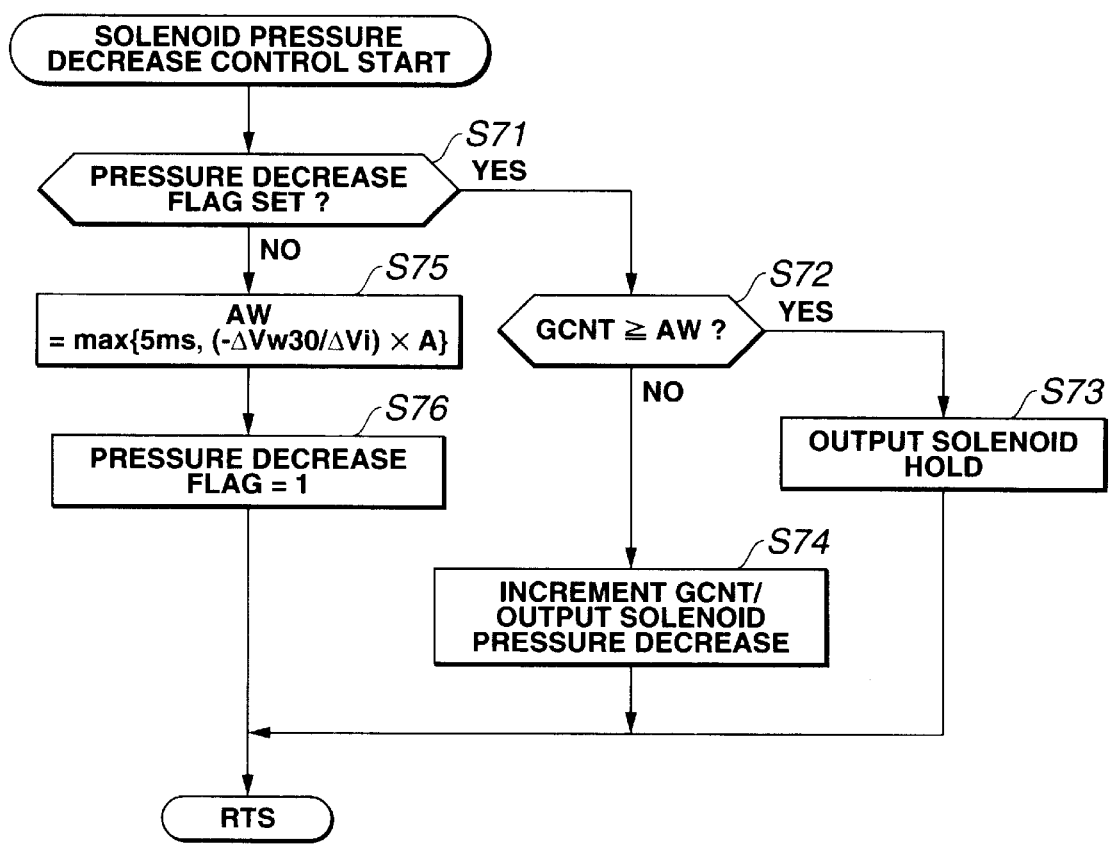
FIG. 5 is a sub operational flowchart representing a solenoid pressure decrease control in the first preferred embodiment of the vehicular brake controlling apparatus.

FIG. 5 shows a flowchart for explaining a detailed pressure decrease control at the step S7 shown in FIG. 4.

That is to say, FIG. 5 shows a subroutine of the step S7 in FIG. 4.

At the step S71, the CPU 12a determines whether the pressure decrease flag is set. If the pressure decrease flag is set at the step S71 (Yes), the controller 12 determines if GCNT$\geq$AW at a step S72. At the step S72, the CPU 12a determines that GCNT$\geq$AW (Yes). If the pressure decrease time AW has passed (Yes), the routine goes to a step S73. At the step S73, the CPU 12a executes a solenoid hold output processing. Before the elapse of the pressure decrease time AW, the routine goes to a step S74 in which the pressure decrease counter GCNT is incremented and the CPU 12a carries out the solenoid pressure decrease output processing to the switching valve 5.

At the step S71 of FIG. 5, if the pressure decrease flag is not set (No), the CPU 12a determines that the pressure decrease processing is to be started and the routine goes to a step S75 in which the pressure decrease time duration AW is selected from either a preset time of 5 ms or (−$\Delta$Vw30/$\Delta$vi)×A. It is noted that $\Delta$Vw30 is the control-purpose road wheel acceleration $\Delta$VwRR0 or $\Delta$Vw30RL0.

After the execution of the step S75, the routine goes to a step S76 in which the pressure decrease flag is set to 1.

Figure 6:
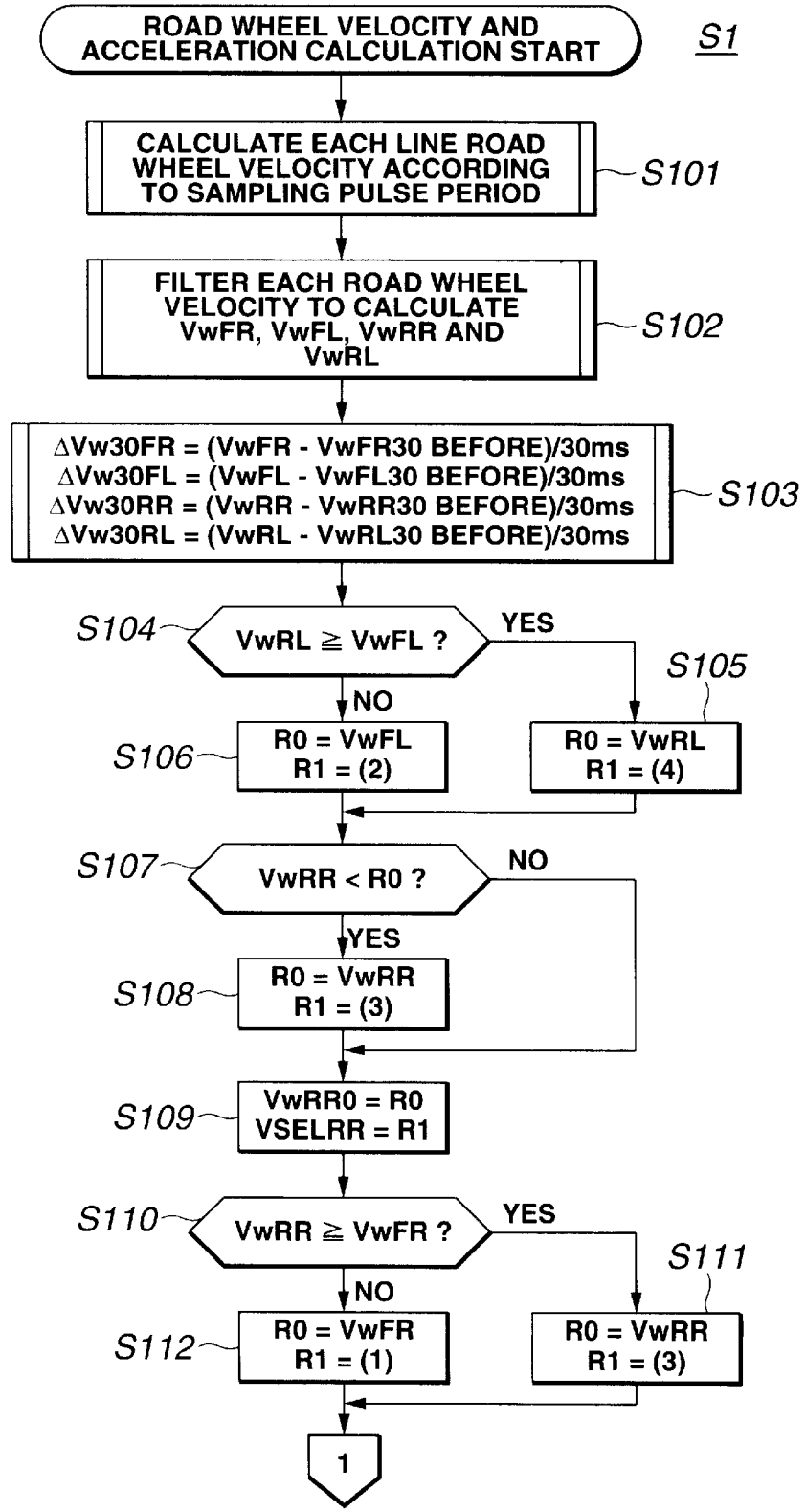
FIG. 6 is a sub operational flowchart representing a stream of generating a control-purpose wheel velocity and control-purpose wheel acceleration in the first preferred embodiment shown in FIGS. 1 through 5.
Figure 7:
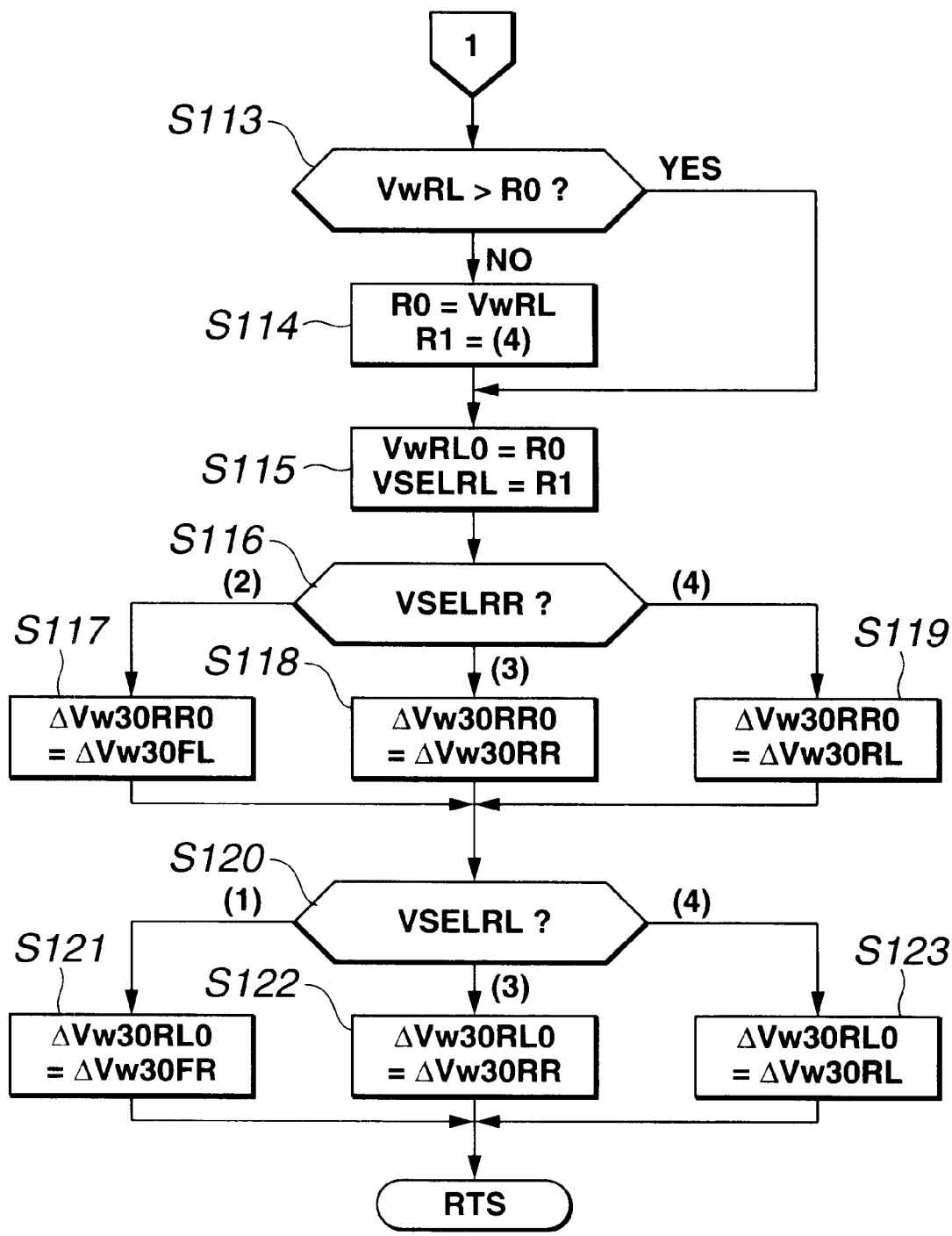
FIG. 7 is a sub operational flowchart representing the stream of generating the control-purpose wheel velocity and control-purpose wheel acceleration in the first preferred embodiment of the vehicular brake controlling apparatus shown in FIGS. 1 through 5 together with the sub operational flowchart shown in FIG. 6.

FIGS. 6 and 7 show integrally an operational flowchart representing the details of calculations of the road wheel velocity Vw and the road wheel acceleration $\Delta$Vw at the step S1 (viz., a subroutine of the step S1).

It is noted that, in the first embodiment, the control-purpose road wheel velocities VwRR0 and VwRL0 at the rear left and right road wheels and the control-purpose road wheel accelerations ΔVwRR0 and ΔVw30RL0 at the rear left and right road wheels are determined through the triangular select.

At a step S101, the CPU 12a calculates raw road wheel velocities of the respective road wheels on the basis of sensor pulse signals outputted from the four wheel road wheel velocity sensors 13 (13RL, 13RR, 13FL, and 13FR).

At a step S102, the CPU 12a filters the respective road wheel velocities VwFR, VwFL, VwRR, and VwRL.

At a step S103, the CPU 12a determines the respective road wheel accelerations ΔVw30FR, ΔVw30FL, ΔVw30RR, and ΔVw30RL by differentiating a difference between the present road wheel velocity Vw (VwFR, VwFL, VwRR, and VwRL) of each road wheel and the previous road wheel velocity Vw30 (Vw30FR, Vw30FL, and Vw30RL) with a period of 30 ms. It is noted that the reason that the differentiation of the road wheel acceleration ΔVw by 30 ms (milliseconds) is to achieve a compatibility between a noise elimination due to an eccentricity of a rotor that each road wheel velocity sensor 13 has and an assurance of a response characteristic to derive each road wheel acceleration.

At a step S104, the CPU 12a determines, for the road wheel located at the left side of the vehicle body, whether the rear road wheel velocity is equal to or greater than the first road wheel velocity, i.e., VwRL≧VwFL. If VwRL≧VwFL at the step S104 (Yes), the routine goes to a step S105 in which a general-purpose first register R0 in the CPU 12a is set to VwRL and a general-purpose second register R1 is set to (4) indicating the rear left road wheel. On the other hand, if VwRL<VwFL (No) at the step S107, the routine goes to a step S106 in which the general-purpose first register R0 is set to the front left road wheel velocity VwFL and the general-purpose second register R1 is set to (2) indicating the front left road wheel.

If VwRR≧R0 (Yes) at the step S107, the routine goes to a step S108.

If VwRR<R0 (No) at the step S107, the routine jumps to a step S109.

At the step S108, the CPU 12a sets the first register R0 to the rear right road wheel velocity VwRR and the second register R1 to (3) indicating the rear right road wheel.

At the step S109, the value of the first register R0 is set as the control-purpose road wheel velocity VwRR0 for the rear right road wheel and the value of the second register R1 is set as a rear right road wheel selection information value VSELRR.

That is to say, the control-purpose road wheel velocity VwRR0 for the rear right road wheel is selected from either one of the front and rear left road wheel velocities VwFL and VwRL which is larger than the other and from either one of the larger one of the front and rear left road wheel velocities or the rear right road wheel velocity VwRR which is smaller than the other and the numerals indicating which one of the road wheels is selected are stored in the second register R1.

At the subsequent step S110, the CPU 12a determines whether the rear right road wheel velocity VwRR is equal to or larger than the front right road wheel velocity VwFR. If VwRR≧VwFR at the step S110 (Yes), the routine goes to a step S111 in which the value of the first register R0 is set to the rear right road wheel velocity VwRR and the value of the second register R1 is set to (3) indicating the rear right road wheel velocity. On the other hand, if VwRR<VwFR at the step S110 (No), the routine goes to a step S112 in which the value of the first register R0 is set to the front right road wheel velocity VwFR and the value of the second register R1 is set to (1) indicating the front right road wheel.

In FIG. 7, at a step S113, the CPU 12a determines the rear left road wheel velocity VwRL is greater than the value of the general-purpose first register R0 (VwRL>R0). If VwRL≦R0 at the step S113 (No), the routine goes to a step S114 to set the general-purpose first register R0 to the rear left road wheel velocity VwRL and to set the general-purpose second register R1 to (4). If VwRL>R0 (Yes) at the step S113, the routine jumps to a step S115.

At the step S115, the CPU 12a sets the rear left control-purpose road wheel velocity VwRL0 to the value of the general-purpose first register R0 (VwRL0=R0) and sets the rear left select information value VSERL to the value of the general-purpose second register R1.

That is to say, the rear left control-purpose road wheel velocity VwRL0 is to select either one of the front and rear right road wheel velocities VwFR and VwRR which is greater than the other and either one of the greater one of VwFR and VwRR or the rear left road wheel velocity VwRL and the numeral indicating any one of the road wheel velocities which has been selected are stored in the general-purpose second register R1. In summary, according to the flow of the step S115 the CPU 12a executes the select processing, i.e., VwRR0 (VWRL0)=min {itself road wheel velocity Vw, max(diagonal line first road wheel velocity Vw, the same axle line other road wheel velocity Vw)}.

Next, at a step S116 in FIG. 7, the CPU 12a determines whether the right select information value VSELRR is any one of (2), (3), and (4).

If VSELRR=(2), the routine goes to a step S117 in which the CPU 12a sets the rear right control-purpose road wheel acceleration ΔVw30RR0 to the front left road wheel acceleration ΔVw30FL before 30 ms.

If VSELRR=(3), the routine goes to a step S118 in which the rear right control-purpose road wheel acceleration ΔVw30RR0 is set to the rear right road wheel acceleration ΔVw30RR before 30 ms.

If VSELRR=(4), the routine goes to a step S119 in which the rear right control-purpose road wheel acceleration ΔVw30RR0 is set to the rear left road wheel acceleration ΔVw30RL before 30 ms.

At the subsequent step S120, the CPU determines whether the left select information VSELRL is any one of (1), (3), or (4). If VSELRL=(1), the routine goes to a step S121 in which the rear left control-purpose road wheel acceleration ΔVw30RL0 is set to the front right road wheel acceleration ΔVw30FR before 30 ms. If VSELRR=(4), the routine goes to a step S213 in which the rear left control-purpose road wheel acceleration ΔVw30RL0 is set to the front right road wheel acceleration ΔVw30FR before 30 ms.

Next, an operation example of the first embodiment will be described below with reference to FIGS. 8A through 8F.

FIGS. 8A through 8F show an example of generating the rear right road wheel control-purpose road wheel velocity VwRR0 for the rear right road wheel. When the braking operation is started, the CPU 12a changes any one of the rear right road wheel velocity VwRR to be selected (denoted by a dot-and-dash line in FIG. 8A), the front left road wheel velocity VwFL (denoted by a dot line in FIG. 8A), each road wheel velocity being that the object to be selected.

It is noted that since the control-purpose road wheel velocity VwRR0 (denoted by a dot line in FIG. 8A) is selected as follows: VwRR0=min{VwRR, max(VwFL, VwRL)}. Hence, VwRR0 is changed as denoted by a bold solid line in FIG. 8A. That is to say, in the example of FIG. 8A, as the control-purpose road wheel velocity VwRR0, the rear right road wheel velocity VWRR is selected until a time point of t1 in FIG. 8A. During the time duration from the time point t1 to a time point t2, the rear left road wheel velocity VwRL is selected as VwRR0. After the time point t2, the CPU 12a selects again the rear right road wheel velocity VwRR.

Figure 8:
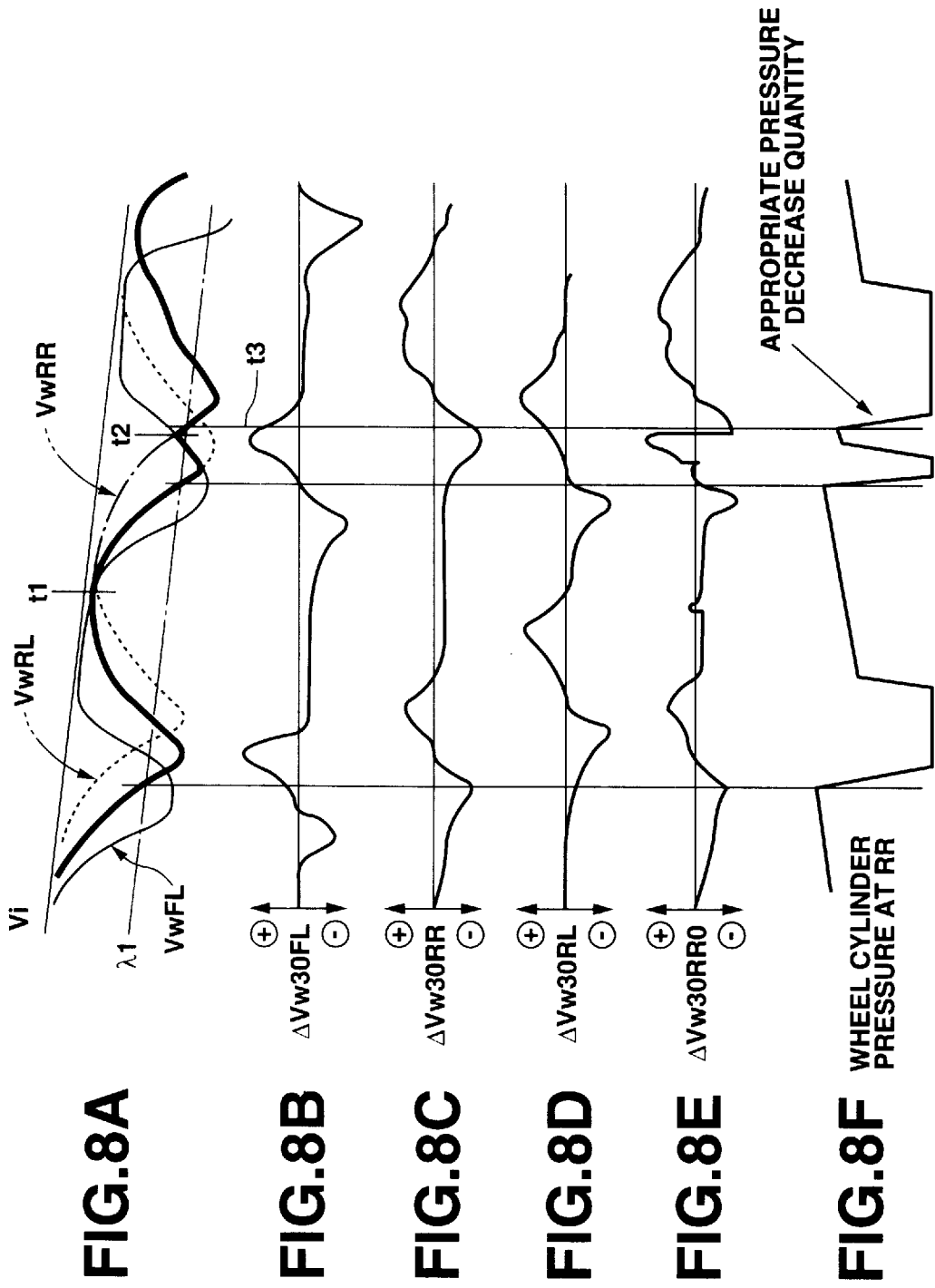
FIGS. 8A, 8B, 8C, 8D, 8E, and 8F are integrally a timing chart for representing an example of operation in the first preferred embodiment of the vehicular brake controlling apparatus.

As the control-purpose road wheel velocity VwRR0 is changed as denoted by the bold solid line of FIG. 8A, the pressure decrease processing is executed for the wheel cylinder on the rear right road wheel whenever the value of the control-purpose road wheel velocity VwRR0 becomes not greater than the pressure decrease threshold value $\lambda 1$.

In addition, when the pressure decrease proccessing is carried out, the pressure decrease quantity is determined using the control-purpose road wheel acceleration $\Delta$Vw30RR0. However, in the first embodiment, when the road wheel to be selected is changed which generates the control-purpose road wheel velocity VwRR0, the road wheel acceleration which corresponds to the road wheel to be selected is selected only from among the road wheel accelerations of the respective road wheels which have been calculated at the step S103. Since the calculation of the road wheel acceleration does not follow the change of the road wheel to be selected, the road wheel acceleration can be provided immediately with a high accuracy.

Hence, a high control responsive characteristic can be achieved. The pressure decrease time duration AW (pressure decrease quantity) at the step S75 cannot indicate excessively small value.

In the case of the example shown in FIGS. 8A through 8F, the pressure decrease is executed at the time point t3 immediately after the change of the time point t2. In a conventional case, since no sufficient time is left from the change timing t2 up to the time point t3, the pressure decrease quantity become excessively small so that it takes a considerable time to return the corresponding road wheel velocity. On the other hand, in the first embodiment, since an accurate control-purpose road wheel acceleration $\Delta$Vw30RR0 can be achieved at the time point of t3, the pressure decrease quantity can become moderate and the recovery of the road wheel velocity can be fastened.

It is noted that, in the case of the selection according to the triangular select low, for example, when the braking operation is carried out during a left turn, a load imposed on right side road wheels which are outer wheels during the left turn of the vehicle becomes heavy and a load weight on the left side, especially, rear road wheel RL which is an inner wheel during the left turn becomes light.

At this time, if the triangular select is carried out with the rear right road wheel the object to be selected, the CPU 12a selects the front left road wheel velocity VwFL since, for the road wheel velocity at the left side road wheel, the rear left road wheel becomes lightest in the road weight and a revolution velocity is reduced. Then, the selection of either one of the front left road wheel velocity VwFL or the rear right road wheel velocity VwRR which is smaller than the other is made. In this state, the front left road wheel velocity VwFL is generally selected.

Hence, as compared with the selection of the rear left road wheel velocity VwRL according to the select low, the road wheel velocity having the greater value is selected as the control-purpose road wheel velocity VwRR0. Consequently, the rear right road wheel is difficult to be pressure decreased, the insufficient braking force becomes prevented to secure the braking force.

Next, when the braking operation is carried out during the vehicular run on a, so-called, a left and right split road surface (the left side is the low frictional coefficient road and the right side is the high frictional coefficient road), the CPU 12a selects the value of the left front and rear road wheels which is rolled on the low frictional coefficient road, i.e., the front left road wheel velocity VwFL since the front road wheel velocity is greater than the rear road wheel velocity during the normal braking. Next, the CPU 12a selects either one of the front left road wheel velocity VwFL or the road wheel velocity of itself road wheel, viz., the rear right road wheel velocity VwRR which is smaller than the other. In this case, the CPU 12a selects the front left road wheel velocity VwFL which is rolling on the low frictional coefficient road surface. Hence, the CPU 12a selects the smaller road wheel velocity VwRR as compared with the selection of the rear right road wheel velocity VwRR which is rolling on the high frictional coefficient road surface. Consequently, the rear right road wheel RR tends to be pressure decreased, tends to increase a side force, and can secure the vehicular running stability.

Next, when the braking operation occurs during the straight run, the CPU 12a selects, at first, either one of the road wheel velocities of the left side front and rear road wheels which is greater than the other (generally, the front left road wheel velocity VwFL is selected due to the greater load weight on the front side road wheel during the braking) and the CPU 12a selects either one of the values of the above-selected road wheel velocity or the rear right road wheel velocity VwRR. Hence, the CPU 12a selects itself road wheel velocity, viz., the rear right road wheel velocity VWRR as the rear right road wheel control-purpose road wheel velocity VwRR0. Consequently, if such a situation as requiring the pressure decrease for the front road wheels occurs, the pressure decrease does not occur unless the road wheel velocity indicates the required state. Without the pressure decrease on the front road wheels, the control over the rear right road wheel RR is executed and the braking force on the rear right road wheel RR can be assured.

Hereinafter, other preferred embodiments of the brake controlling apparatus according to the present invention will be described below. The same explanation as described in the first preferred embodiment will be omitted and difference points will be described.

(Second Embodiment)

In the second embodiment, the CPU 12a executes the select low processing as the control-purpose road wheel velocity $\Delta$VwRR0 common to the rear left and right road wheels.

Figure 9:
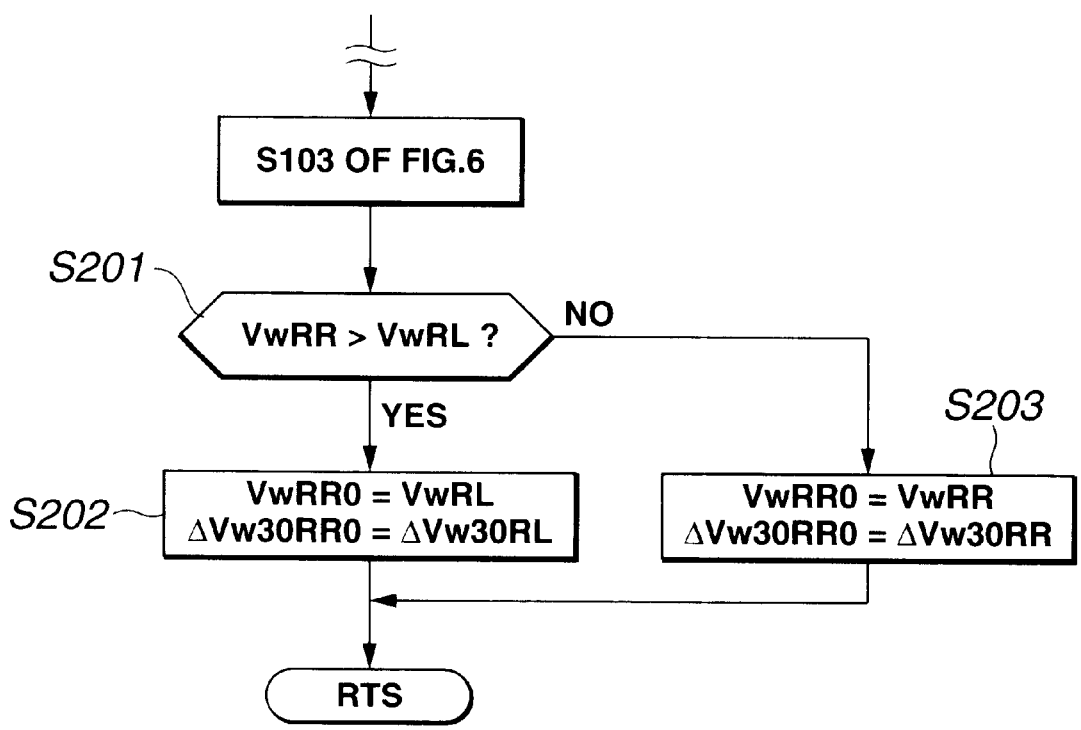
FIG. 9 is an operational flowchart of the control-purpose road wheel acceleration in a second preferred embodiment of the vehicular brake controlling apparatus.

FIG. 9 shows an operational flowchart indicating a flow of the essential part of the select low processing at the rear right road wheel control-purpose road wheel velocity VwRR0.

It is noted that the subsequent steps after the step S103 shown in the flowchart of FIGS. 6 and 7 described in the first embodiment are different from those shown in FIG. 9.

At a step S201, the CPU 12a determines whether the rear right road wheel velocity VwRR is greater than the rear left road wheel velocity VwRL. If VwRR>VwRL at the step S201, the routine goes to a step S202 in which the rear left road wheel velocity VwRL is set to the control-purpose road wheel velocity VwRR0. At the same time, the CPU 12a, at the step S202, executes the rear left road wheel acceleration $\Delta$Vw30RL to be set to the control-purpose road wheel acceleration $\Delta$Vw30RR0.

On the other hand, if VwRR<VwRL at the step S201 (No), the routine goes to a step S203 in which the control-purpose rear right road wheel velocity VwRR0 is set to the rear right road wheel velocity VwRR and the rear right road wheel acceleration ΔVw30RR is set to the control-purpose road wheel acceleration ΔVw30RR0.

FIGS. 10A through 10E integrally show the timing chart representing an example of the operation in the second embodiment.

Figure 10:
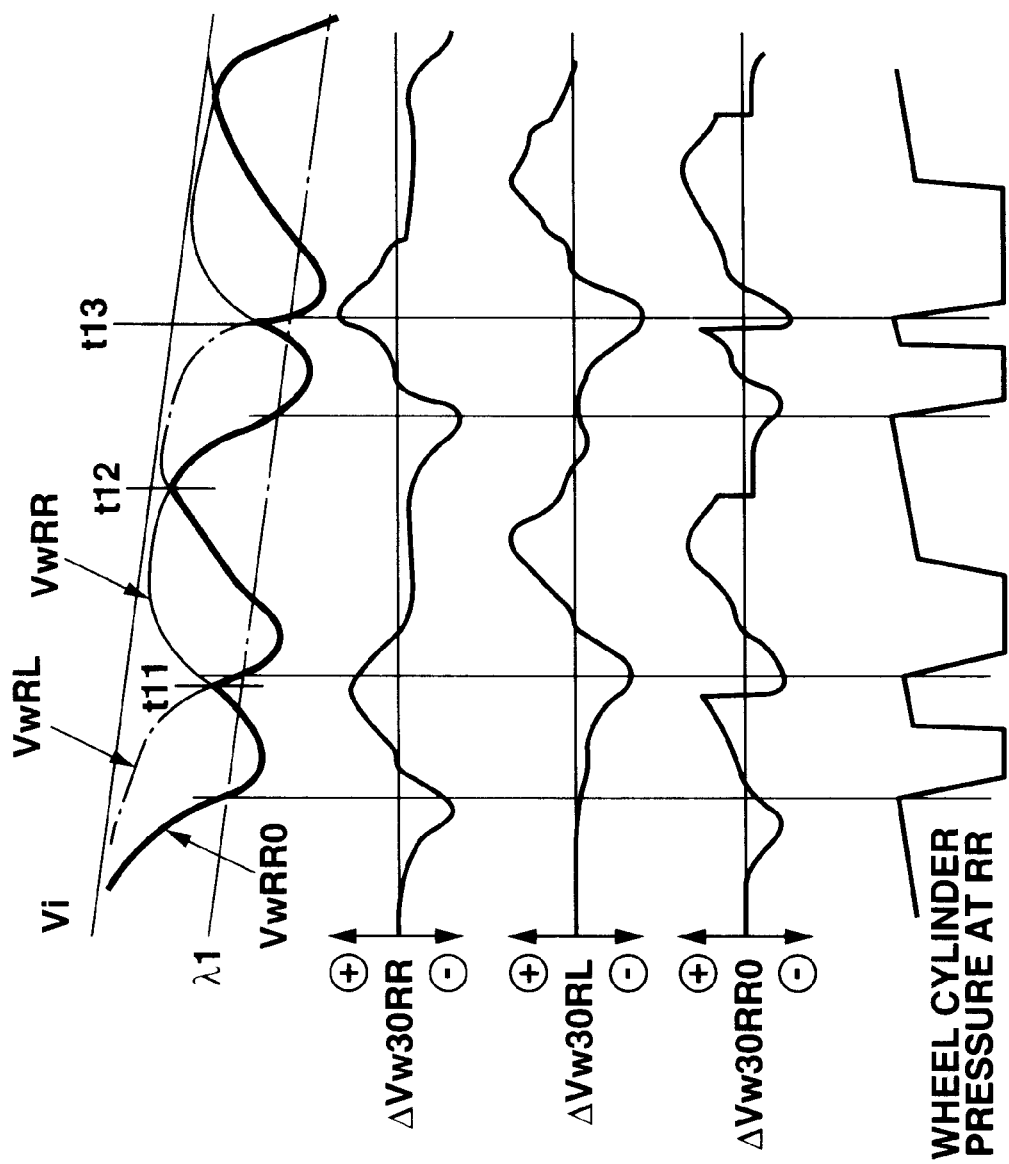
FIGS. 10A, 10B, 10C, 10D, and 10E are integrally a timing chart for representing an example of operation in the second preferred embodiment of the vehicular brake controlling apparatus.

If the rear right road wheel velocity VwRR denoted by the thin solid line and the rear left road wheel velocity denoted by the dot-and-dash line are varied as shown in FIG. 10A during the braking operation, the rear right road wheel control-purpose road wheel velocity VwRR0 is varied as denoted by the bold solid line. At timings of t11, t12, and t13, the CPU 12a switches any one of the road wheels which is to be selected. In the case of the second embodiment, since the road wheel acceleration is selected which is derived at the step S103 as the control-purpose road wheel velocity VwRR0, a highly accurate value can be determined instantaneously and the response delay or pressure decrease quantity cannot be excessively small.

(Third Embodiment)

Figure 11:
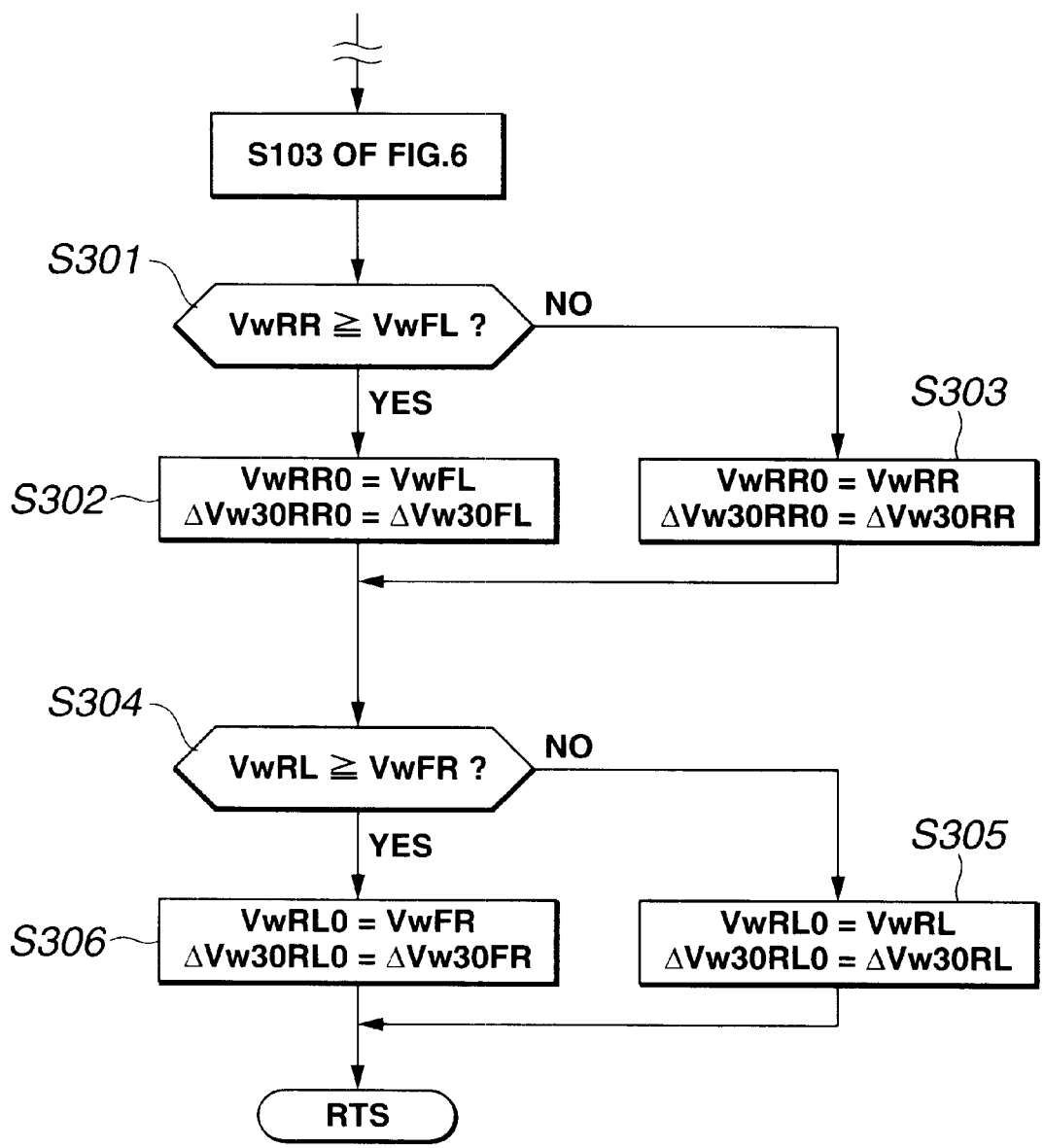
FIG. 11 is a sub operational flowchart representing the stream of generating the control-purpose wheel velocity and control-purpose wheel acceleration in a third preferred embodiment of the vehicular brake controlling apparatus.

FIG. 11 shows an operational flowchart of the essential part of a third preferred embodiment indicating an example of the diagonal select low.

In the third embodiment, the steps after the step S103 shown in the flowchart of FIGS. 6 and 7 as described in the first embodiment are different from those to be described in the third embodiment.

At a step S301, the CPU 12a of the controller 12 determines if the rear right road wheel velocity VwRR is equal to or greater than the front left road wheel velocity VwFL.

If VwRR≧VwFL at the step S301 (Yes), the routine goes to a step S302 in which the front left road wheel velocity VwFL is set to the control-purpose road wheel velocity ΔVwRR0 and sets the road wheel acceleration ΔVw30FL of the front left road wheel to the control-purpose road wheel acceleration ΔVw30RR0.

On the other hand, if VwRR<VwFL (No) at the step S301, the routine goes to a step S303 in which the rear right road wheel velocity VwRR is set as the rear right road wheel control-purpose road wheel velocity VwRR0 and the rear right road wheel acceleration ΔVw30RR0 is set to the rear right road wheel acceleration ΔVw30RR.

At the subsequent step S304, the CPU 12 determines if the rear left road wheel velocity VwRL is equal to or greater than the front right road wheel velocity VwFR.

If VwRL<VwFR at the step S304 (No), the routine goes to a step S305 in which the rear left road wheel velocity VwRL is set to the rear left road wheel control-purpose road wheel velocity VwRL0 and the rear left road wheel acceleration ΔVwRL0 is set to the rear left road wheel acceleration ΔVw30RL0.

If VwRL≧VwFR at the step S304, the routine goes to a step S306 in which the control-purpose rear left road wheel velocity VwRL0 is set to the front right road wheel velocity VwFR and the rear left control-purpose road wheel acceleration ΔVw30RL0 is set to the front right road wheel acceleration ΔVw30FR.

FIGS. 12A through 12E show integrally operation examples in the third embodiment.

Figures 12A, 12B, 12C, 12D, 12E:
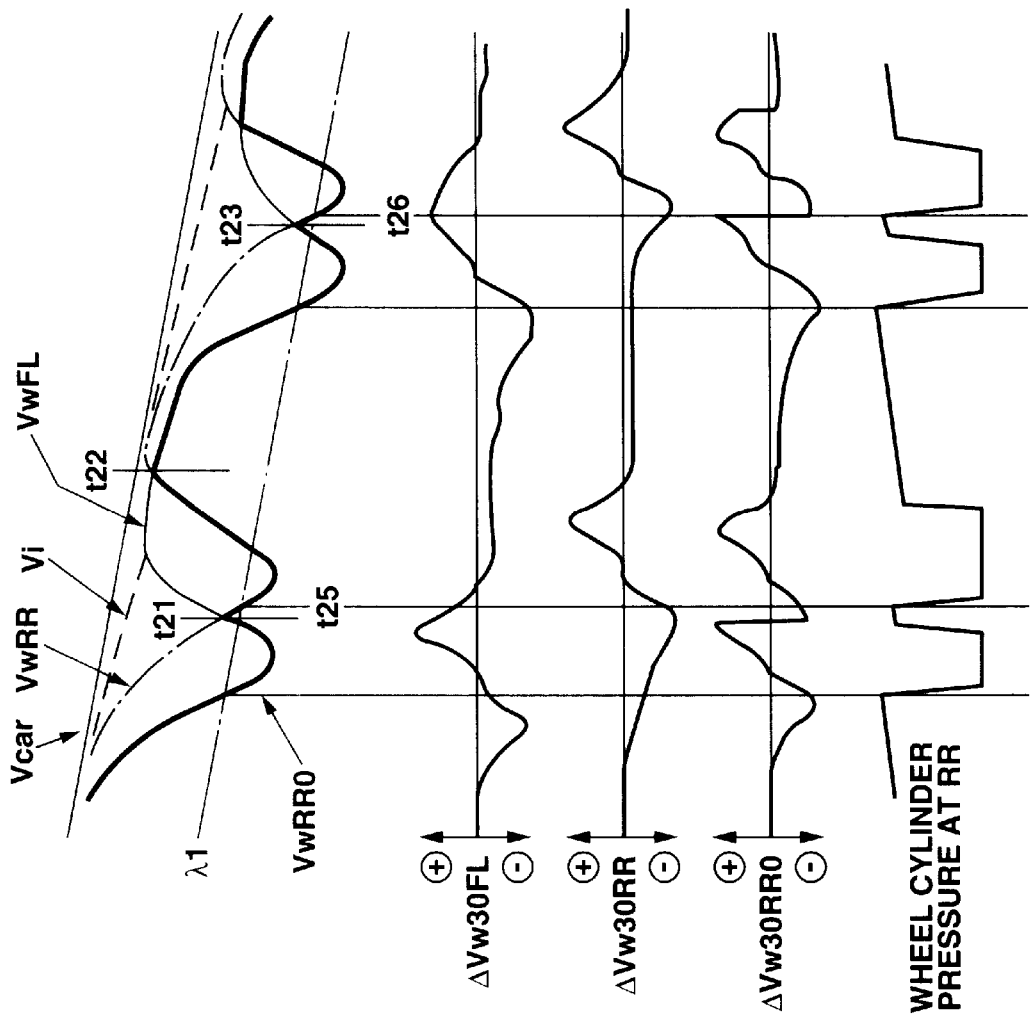
FIGS. 12A, 12B, 12C, 12D, and 12E are integrally a timing chart representing the operation example of the third preferred embodiment of the vehicular brake controlling apparatus.

In a case where the rear right road wheel velocity VwRR denoted by the dot-and-dash line shown in FIG. 12A and the front left road wheel velocity VwFL denoted by the thid solid line are varied as shown in FIG. 12A, the rear right road wheel control-purpose road wheel velocity VwRR0 is changed as shown in FIG. 12 (denoted by the bold solid line).

The road wheel to be selected is switched at time points of t21, t22, and t24.

In the case of the third embodiment, the pressure decrease is executed at time points of t25 and t26 immediately after the time points of t21 and t23 as shown in FIGS. 12A through 12E.

In the third embodiment, since only the road wheel acceleration is selected derived at the step S103 as the control-purpose road wheel velocity VwRR0, a highly accurate value can be achieved instantaneously. Hence, no response delay nor the pressure decrease quantity cannot be excessively small.

(Fourth Embodiment)

Figure 13:
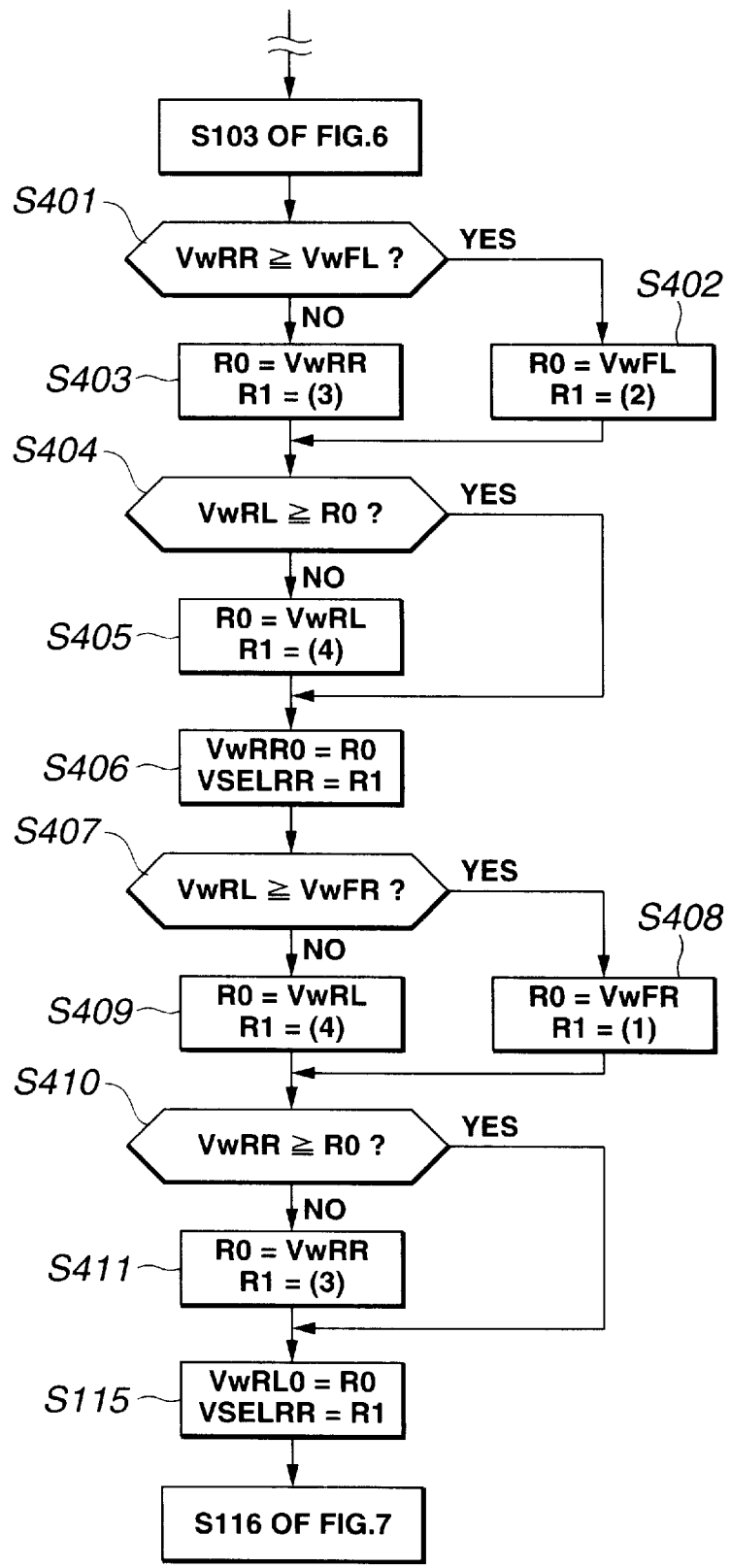
FIG. 13 is an operational flowchart representing the operation example of a fourth preferred embodiment of the vehicular brake controlling apparatus.

FIG. 13 shows an operational flowchart of an essential part of a fourth preferred embodiment of the brake controlling apparatus representing an example of the triangular select low processing.

In the fourth embodiment, intermediate steps between the step S103 shown in the flowchart of FIGS. 6 and 7 and the step S106 are different from those steps described in the first embodiment.

In details, at a step S401, the CPU 12a of the controller 12 determines whether the rear right road wheel velocity VwRR is equal to or greater than the front left road wheel velocity VwFL. If VwRR≧VwFL (yes) at the step S401, the routine goes to a step S402 in which the general-purpose first register R0 is set to the front left road wheel velocity VwFL and the general-purpose second register R1 is set to (2) indicating the front left road wheel FL.

On the other hand, if VwRR<VwFL (No) at the step S401, the routine goes to a step S403 in which the general-purpose first register R0 is set to the rear right road wheel velocity VwRR and the general-purpose second register R1 is set to (3) indicating the rear right road wheel.

At a step S404, the CPU 12a determines whether the rear left road wheel velocity VwRL is equal to or greater than the value set at the general-purpose first register R0. If VwRL≧R0 at the step S404, the routine goes to a step S406 in which the rear right control-purpose road wheel velocity VwRR0 is set to the value of the general-purpose first register R0 and the rear right select information value VSELRR is set to the value of the general-purpose second register R1. On the other hand, if, at the step S404, VwRL<R0 (No), the routine goes to a step S405 in which the rear left road wheel velocity VwRL is stored in the general-purpose first register R0 and (4) indicating the rear left road wheel RL is set to the general-purpose second register R1.

At a step S407, the CPU 12a of the controller 12 determines if the rear left road wheel velocity VwRL is equal to or greater than the front right road wheel velocity VwFR.

If VwRL≧VwRL (Yes) at the step S407, the routine goes to a step S408 in which the value of the general-purpose first register R0 is set to the front right road wheel velocity VwFR and the value of the general-purpose second register R1 is set to (1) indicating the front right road wheel. If VwRL<VwFR (No) at a step S407, the routine goes to a step S409 in which the value of the general-purpose first register R0 is set to the front left road wheel velocity VwFL and the value of the general-purpose second register R1 is set to (2) indicating the front left road wheel FL.

At a step S410, the CPU 12a of the controller 12 determines if the rear right road wheel velocity VwRR is equal to or greater than the value set at the general-purpose first register R0.

If VwRR<R0 (No) at the step S410, the routine goes to a step S411 in which the general-purpose first register R0 is set to the rear right road wheel velocity VwRR and the general-purpose second register R1 is set to (3) indicating the rear right road wheel RR.

If VwRR≧R0 at the step S410, the routine goes to a step S412 in which the rear left general-purpose road wheel velocity VwRL0 is set to the value set at the general-purpose first register R0 and the value of the general-purpose second register R1 is set as the rear left road wheel select information value VSELRL.

FIGS. 14A, 14B, 14C, 14D, 14E, and 14F integrally show an operation example in the case of the fourth embodiment of the brake controlling apparatus.

In a case where each of the rear right road wheel velocity VwRR denoted by the thin solid line shown in FIG. 14A, the rear left road wheel velocity VwRL denoted by the dot-and-dash line shown in FIG. 14A, and the front left road wheel velocity VwFL denoted by the dot line in FIG. 14A is varied during the brake operation as shown in FIGS. 14A through 14F. In this example, in the same manner as described in each of the first, second, and third embodiments, the road wheel acceleration derived at the step S103 at the control-purpose road wheel velocity VwRR0 is only selected. Hence, the highly accurate value can be determined instantaneously and no response delay nor the pressure decrease quantity cannot be excessively small.

It is noted that, at the step S5 in FIG. 4, each road wheel velocity Vw (VwFL, VwFR, VwRL, and VwRR) is sequentially compared with λ1 for each control period, each road wheel acceleration ΔVw (ΔVwFR, ΔVwFR, ΔVwRL, and ΔVwRR) is also sequentially compared with λ2 at the step S6 in FIG. 4, and itself road wheel velocity means one of the road wheel velocities of the corresponding road wheel that is to be controlled in the anti-lock brake control at the present control period.

The entire contents of Japanese Patent Application No. Heisei 10-368676 (filed in Japan on Dec. 25, 1998) are incorporated herein by reference. Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the following claims.

What is claimed is:

1. A vehicular brake controlling apparatus comprising:
   a brake unit arranged to enable an independent control of braking liquid pressures for respective wheel cylinders to brake their corresponding road wheels of the vehicle;
   a plurality of road wheel velocity sensors to detect respective wheel velocities of the road wheels of the vehicle, the road wheels being front left and right and rear left and right road wheels; and
   a controller, the controller including:
      a road wheel acceleration calculating section to calculate road wheel accelerations of the respective road wheels from respective road wheel velocity values detected by the road wheel velocity sensors;
      a road wheel velocity select processing section to select any one of the road wheel velocities including the road wheel velocity of one of the road wheels that is an object to be controlled in an anti-lock brake control during a brake operation on the basis of a predetermined condition, the selected road wheel velocity serving as a control-purpose road wheel velocity;
      a control-purpose road wheel acceleration generating section to select any one of the road wheel accelerations from among results of calculations of the road wheel accelerations by means of the road wheel acceleration calculating section which corresponds to one of the road wheel velocities which is selected by the road wheel velocity select processing section so as to generate a control-purpose road wheel acceleration; and
      an anti-lock brake controlling section to execute the anti-lock brake control for each road wheel through the brake unit during the brake operation using the control-purpose road wheel velocity and the control-purpose road wheel acceleration so as to prevent a wheel's lock for each road wheel from occurring.

2. A vehicular brake controlling apparatus as claimed in claim 1, wherein the brake controlling section includes a pressure decrease quantity determinator to determine a pressure decrease quantity in the anti-lock brake control using the control-purpose road wheel acceleration.

3. A vehicular brake controlling apparatus as claimed in claim 1, wherein the road wheel velocity select processing section selects any one of the road wheel velocities on the basis of a select low processing such that either one of the road wheel velocities which corresponds to either one of the road wheel of the object to be controlled and one of the front left and right road wheels which is on a diagonal line extended from the road wheel of the object to be controlled which is smaller than the other is selected as the control-purpose road wheel velocity on the corresponding one of the rear left and right road wheels.

4. A vehicular brake controlling apparatus as claimed in claim 1, wherein the road wheel velocity select processing section selects any one of the road wheel velocities on the basis of a diagonal select processing such that either one of the road wheel velocities which corresponds to either one of the road wheel of the object to be controlled and one of the front left and right road wheels which is on a diagonal line extended from the road wheel of the object to be controlled which is smaller than the other is selected as the control-purpose road wheel velocity on the corresponding one of the rear left and right road wheels.

5. A vehicular brake controlling apparatus as claimed in claim 1, wherein the road wheel velocity select processing section selects any one of the road wheel velocities on the basis of a triangular select low processing such that any one of the road wheel velocities which corresponds to any one of the road wheel of the object to be controlled, the other road wheel on the same wheel axle as the road wheel of the object to be controlled, the other road wheel on the same wheel axle as the road wheel of the object to be controlled, and one of the front left and right road wheels on a diagonal line extended from the road wheel of the object to be controlled which is the smallest than any other road wheel velocities as the control-purpose road wheel velocity is selected as a rear road wheel control-purpose road wheel velocity.

6. A vehicular brake controlling apparatus as claimed in claim 1, wherein the road wheel velocity select processing section selects any one of the road wheel velocities on the basis of a triangular select processing such that any one of the road wheel velocities which corresponds to either one of the other road wheel on the same axle as the road wheel of the object to be controlled and the one of the front left and right road wheels on a diagonal line extended from the road wheel of the object to be controlled which provides a velocity value larger than the other and either one of the road wheel velocities which provides the velocity larger than the other and the road wheel velocity of the road wheel of the object to be controlled which provides a smaller road wheel velocity value than the other is selected as the control-purpose road wheel velocity on the corresponding one of the rear left and right road wheels.

7. A vehicular brake controlling apparatus as claimed in claim 6, wherein the road wheel acceleration calculating section calculates the respective road wheel accelerations $\Delta VwFL$, $\Delta VwFR$, $\Delta VwRL$, and $\Delta VwRR$ by differentiating the respectively corresponding road wheel velocity values VwFL, VwFR, VwRL, and VwRR with respect to a first predetermined time period.

8. A vehicular brake controlling apparatus as claimed in claim 7, wherein the anti-lock brake controlling section further includes: a pseudo vehicular body velocity calculating section to calculate a pseudo vehicular body velocity using the control-purpose road wheel velocity values VwRR0 and VwRL0 on both of the rear left and right road wheels; a vehicular body deceleration calculating section to calculate a vehicular body deceleration from a variation rate of the pseudo vehicular body velocity Vi per a unit of time; and a pressure decrease threshold value calculating section to calculate a pressure decrease threshold value $\lambda 1$ for each road wheel on the basis of the pseudo vehicular body velocity and the control-purpose road wheel acceleration $\Delta Vw30RR0$ and $\Delta Vw30RR0$ on both of the rear left and right road wheels.

9. A vehicular brake controlling apparatus as claimed in claim 8, wherein the anti-lock brake controlling section further includes: a road wheel velocity determining section to determine if each road wheel velocity VwFL, VwFR, VwRL, and VwRR is not larger than the pressure decrease threshold value $\lambda 1$; a solenoid pressure decrease control section to control a switching valve of the brake unit to decrease the braking liquid pressure of the corresponding wheel cylinder for a second predetermined period of time AW when determining that one of the road wheel velocity values which corresponds to the wheel cylinder whose braking liquid pressure is decreased is not greater than the pressure decrease threshold value $\lambda 1$.

10. A vehicular brake controlling apparatus as claimed in claim 9, wherein the second predetermined period of time AW is determined according to which of a preset time or a calculated time determined according to the control-purpose road wheel acceleration $\Delta Vw30$ and the vehicular body deceleration $\alpha Vi$ is greater than the other.

11. A vehicular brake controlling apparatus as claimed in claim 9, wherein the anti-lock brake controlling section further includes: a road wheel acceleration determining section to determine whether each road wheel acceleration $\Delta Vw$ ($\Delta VwFL$, $\Delta VwFR$, $\Delta VwRL$, and $\Delta VwRR$) is not greater than a predetermined hold threshold value $\lambda 2$; a solenoid pressure increase control section to control the switching valve of the brake unit to increase the braking liquid pressure of the corresponding wheel cylinder when one of the road wheel velocity values which corresponds to the wheel cylinder whose braking liquid pressure is increased is equal to or greater than the predetermined hold threshold value $\lambda 2$; and a solenoid pressure hold control section to control the switching valve of the brake unit to hold the braking liquid pressure of the corresponding wheel cylinder when one of the road wheel velocity values which corresponds to the wheel cylinder whose braking liquid pressure is held is not greater than the predetermined hold threshold value $\lambda 2$.

12. A vehicular brake controlling apparatus as claimed in claim 7, wherein the first predetermined period of time is three times as long as a control period of the controller.

13. A vehicular brake controlling apparatus as claimed in claim 12, wherein the control period of the controller is 10 milliseconds.

14. A vehicular brake controlling apparatus as claimed in claim 10, wherein the preset time is 5 milliseconds and the calculated time is expressed as $(-\Delta Vw30/\Delta Vi)$ A, wherein $\Delta Vw30$ corresponds to the control-purpose road wheel acceleration and A denotes a constant.

15. A vehicular brake controlling apparatus as claimed in claim 6, wherein the triangular select processing is expressed as: VwRR0 (VwRL0)=min {itself road wheel velocity Vw, max(diagonal line front road wheel velocity Vw, the other road wheel velocity on the same axle as the itself road wheel)}, wherein VwRR0 denotes the control-purpose road wheel velocity on the rear right road wheel and VwRL0 denotes the control-purpose road wheel velocity on the rear left road wheel.

16. A vehicular brake controlling apparatus as claimed in claim 3, wherein the select low processing is expressed as VwRR0 (VwRL0)=min (itself road wheel velocity Vw, the road wheel velocity of the other road wheel on the same axle as the itself road wheel Vw), wherein VwRR0 denotes the control-purpose road wheel velocity on the rear right road wheel and VwRL0 denotes the control-purpose road wheel velocity on the rear left road wheel.

17. A vehicular brake controlling apparatus as claimed in claim 4, wherein the diagonal select processing is expressed as: VwRR0 (VwRL0)=min(itself road wheel velocity Vw, the diagonal front road wheel velocity Vw), wherein VwRR0 denotes the control-purpose road wheel velocity on the rear right road wheel and VwRL0 denotes the control-purpose road wheel velocity on the rear left road wheel.

18. A vehicular brake controlling apparatus as claimed in claim 5, wherein the triangular select low processing is expressed as: VwRR0(VwRL0)=min(itself road wheel velocity Vw, the road wheel velocity on the other road wheel on the same axle as itself road wheel Vw, diagonal front road wheel velocity Vw), wherein VwRR0 denotes the control-purpose road wheel velocity on the rear right road wheel and VwRL0 denotes the control-purpose road wheel velocity on the rear left road wheel.

19. A brake controlling method for an automotive vehicle, the vehicle including:
   a brake unit arranged to enable an independent control of braking liquid pressures for respective wheel cylinders to brake their corresponding road wheels of the vehicle;
   a plurality of road wheel velocity sensors to detect respective wheel velocities of the road wheels of the vehicle, the road wheels being front left and right and rear left and right road wheels; and
   a controller,
   the brake controlling method comprising the steps of:
      calculating road wheel accelerations of the respective road wheels from respective road wheel velocity values;
      selecting any one of the road wheel velocities including the road wheel velocity of one of the road wheels that is an object to be controlled in an anti-lock brake control during a brake operation on the basis of a predetermined condition, the selected road wheel velocity serving as a control-purpose road wheel velocity;
      selecting any one of the road wheel accelerations from among results of calculations of the road wheel accelerations which corresponds to one of the road wheel velocities which is selected so as to generate a control-purpose road wheel acceleration; and executing the anti-lock brake control for each road wheel through the brake unit during the brake operation using the control-purpose road wheel velocity and the control-purpose road wheel acceleration so as to prevent a wheel's lock for each road wheel from occurring.

* * * * *